(12) United States Patent
Wang et al.

(10) Patent No.: US 11,092,748 B2
(45) Date of Patent: Aug. 17, 2021

(54) METHOD AND APPARATUS FOR SELF-ALIGNMENT CONNECTION OF OPTICAL FIBER TO WAVEGUIDE OF PHOTONIC INTEGRATED CIRCUIT

(71) Applicant: KVH Industries, Inc., Middletown, RI (US)

(72) Inventors: Liming Wang, Tinley Park, IL (US); Martin A. Kits van Heyningen, Newport, RI (US)

(73) Assignee: KVH INDUSTRIES, INC., Middletown, RI (US)

( * ) Notice: Subject to any disclaimer, the term of this patent is extended or adjusted under 35 U.S.C. 154(b) by 0 days.

(21) Appl. No.: 16/130,794

(22) Filed: Sep. 13, 2018

(65) Prior Publication Data

US 2019/0086614 A1 Mar. 21, 2019

Related U.S. Application Data

(60) Provisional application No. 62/559,307, filed on Sep. 15, 2017.

(51) Int. Cl.
| | | |
|---|---|---|
| G02B 6/30 | (2006.01) | |
| G02B 6/28 | (2006.01) | |
| G02B 6/122 | (2006.01) | |

(52) U.S. Cl.
CPC ............ *G02B 6/305* (2013.01); *G02B 6/30* (2013.01); *G02B 6/122* (2013.01); *G02B 6/2826* (2013.01)

(58) Field of Classification Search
None
See application file for complete search history.

(56) References Cited

U.S. PATENT DOCUMENTS

| | | |
|---|---|---|
| 4,678,267 A | 7/1987 | Burns |
| 4,842,358 A | 6/1989 | Hall |
| (Continued) | | |

FOREIGN PATENT DOCUMENTS

| | | |
|---|---|---|
| CN | 107843957 A | 3/2018 |
| EP | 0279603 A2 | 8/1988 |
| (Continued) | | |

OTHER PUBLICATIONS

International Search Report and Written Opinion for PCT/US2018/050896 dated Jan. 7, 2019 entitled "Method and Apparatus for Self-Alignment Connection of Optical Fiber to Waveguide of Photonic Integrated Circuit".

(Continued)

*Primary Examiner* — Tina M Wong
(74) *Attorney, Agent, or Firm* — Hamilton, Brook, Smith & Reynolds, P.C.

(57) ABSTRACT

An optical device comprises a fiber having a cladding and a core, and a target PIC waveguide having a cladding and a core. The cladding on one side of the input fiber is removed at the end of the fiber and a flat surface is created along the fiber core, close to the core, exposing the fiber core. A flat-bottomed channel having an in-plane angle with respect to the symmetric axis of the PIC waveguide is fabricated on the top layer of the PIC waveguide in the coupling area, exposing the upper surface of the tapered planar waveguide. The flat surface of the fiber and the top surface of the waveguide is contacting, so the core of the fiber is intersected at an angle with respect to the symmetric axis of the target waveguide and close together at the intersection as an interacting region to define a hybrid waveguide.

24 Claims, 13 Drawing Sheets

(56) References Cited

U.S. PATENT DOCUMENTS

| | | | |
|---|---|---|---|
| 4,890,922 A | | 1/1990 | Wilson |
| 4,938,594 A | | 7/1990 | Pavlath |
| 4,969,742 A | | 11/1990 | Falk |
| 5,037,205 A | | 8/1991 | Pavlath |
| 5,194,917 A | | 3/1993 | Regener |
| 5,223,911 A | | 6/1993 | Suchoski |
| 5,365,338 A | | 11/1994 | Bramson |
| 5,436,992 A | | 7/1995 | Wang |
| 5,475,771 A | | 12/1995 | Hosoi |
| 5,579,424 A | | 11/1996 | Schneider |
| 5,600,745 A | | 2/1997 | Wuu |
| 5,729,641 A | | 3/1998 | Chandonnet |
| 5,838,844 A | | 11/1998 | Van Dam |
| 5,946,434 A | | 8/1999 | Lee |
| 5,982,961 A | | 11/1999 | Pan |
| 6,108,086 A | | 8/2000 | Michal |
| 6,140,009 A | | 10/2000 | Wolk |
| 6,163,632 A | | 12/2000 | Rickman |
| 6,293,688 B1 | | 9/2001 | Deacon |
| 6,360,038 B1 | | 3/2002 | Grubsky |
| 6,445,455 B1 | | 9/2002 | Hall |
| 6,680,472 B1 | | 1/2004 | Thingboet |
| 6,760,520 B1 | * | 7/2004 | Medin .................. G02B 6/305 385/43 |
| 6,905,904 B2 | | 6/2005 | Gardner |
| 6,920,257 B1 | | 7/2005 | Mekis |
| 7,061,610 B2 | | 6/2006 | Mittelstein |
| 7,085,441 B1 | | 8/2006 | Kozlov |
| 7,218,809 B2 | | 5/2007 | Zhou |
| 7,224,878 B1 | | 5/2007 | Wessels |
| 7,899,286 B2 | * | 3/2011 | Yoshida ................ G02B 6/305 385/39 |
| 8,121,874 B1 | | 2/2012 | Guheen |
| 9,739,938 B2 | | 8/2017 | Shi |
| 9,746,612 B2 | * | 8/2017 | Lipson ................ G02B 6/4291 |
| 10,018,789 B2 | * | 7/2018 | Wang ................... G02B 6/1221 |
| 10,274,319 B2 | | 4/2019 | Wang |
| 10,488,596 B2 | * | 11/2019 | Akiyama ................ G02B 6/12 |
| 10,545,288 B2 | | 1/2020 | Ma |
| 10,921,682 B1 | | 2/2021 | Wang |
| 2002/0024786 A1 | | 2/2002 | Sanders |
| 2002/0197037 A1 | | 12/2002 | Bailey |
| 2003/0081902 A1 | * | 5/2003 | Blauvelt ............... G02B 6/125 385/50 |
| 2004/0057667 A1 | * | 3/2004 | Yamada ............... G02B 6/1228 385/43 |
| 2004/0168234 P1 | | 8/2004 | Fischer |
| 2004/0223695 A1 | | 11/2004 | Kersten |
| 2005/0021348 A1 | | 1/2005 | Chan |
| 2005/0025427 A1 | | 2/2005 | Dougherty |
| 2006/0251849 A1 | | 11/2006 | Blauvelt |
| 2007/0053625 A1 | | 3/2007 | Ichioka |
| 2007/0229838 A1 | | 10/2007 | Greening |
| 2008/0291459 A1 | | 11/2008 | Meyer |
| 2009/0087144 A1 | * | 4/2009 | Yoshida ................ G02B 6/107 385/43 |
| 2009/0190876 A1 | | 7/2009 | Doi |
| 2010/0137849 A1 | | 6/2010 | Bhandari |
| 2013/0202250 A1 | | 8/2013 | Guattari |
| 2013/0308897 A1 | | 11/2013 | Sercel |
| 2014/0075357 A1 | | 3/2014 | Flores |
| 2014/0185979 A1 | | 7/2014 | Evans |
| 2014/0376083 A1 | | 12/2014 | Onaka |
| 2015/0021291 A1 | * | 1/2015 | Shastri .................. B32B 37/16 216/24 |
| 2015/0212271 A1 | | 7/2015 | Chen |
| 2015/0027042 A1 | | 10/2015 | Goodwill |
| 2015/0277156 A1 | | 10/2015 | Kondou |
| 2017/0131472 A1 | * | 5/2017 | Kobyakov ........... G02B 6/1228 |
| 2017/0168234 A1 | | 6/2017 | Shi |
| 2017/0192171 A1 | | 7/2017 | Shi |
| 2017/0205583 A1 | * | 7/2017 | Bennett ............. G02B 6/02033 |
| 2017/0329082 A1 | | 11/2017 | Ma |
| 2018/0120504 A1 | * | 5/2018 | Qi ......................... G02B 6/124 |
| 2019/0086614 A1 | * | 3/2019 | Wang ..................... G02B 6/305 |
| 2020/0371286 A1 | | 11/2020 | Wang |
| 2021/0048721 A1 | | 2/2021 | Wang |

FOREIGN PATENT DOCUMENTS

| | | |
|---|---|---|
| EP | 0893671 | 1/1990 |
| EP | 0379520 A1 | 8/1990 |
| EP | 0883000 A1 | 12/1998 |
| EP | 1025422 A1 | 8/2000 |
| EP | 1396741 A1 | 3/2004 |
| EP | 2096408 A2 | 4/2008 |
| EP | 2246663 A2 | 3/2010 |
| GB | 2201256 A | 8/1988 |
| JP | H09159865 A | 6/1997 |
| JP | 20070272121 A | 10/2007 |
| JP | 20120215901 A | 11/2012 |
| WO | 198901534 A1 | 11/1989 |
| WO | 2018165238 A1 | 9/2018 |
| WO | 2018175524 A1 | 9/2018 |
| WO | 2019055663 A1 | 3/2019 |
| WO | 2020077216 A1 | 4/2020 |
| WO | 2020092789 A1 | 5/2020 |

OTHER PUBLICATIONS

Cheng, Z.J., et al., "Polymer-waveguide-based vertical coupler", Optics Communications, vol. 260, No. 2, Apr. 15, 2006.

Shang. K., et al., "Low-loss compact multilayer silicon nitride platform for 3D photonic integrated circuits" Optics Express, vol. 23, No. 16, Aug. 6, 2015.

Hammer, M.., et al., "Hybrid coupled-mode modeling in 3D: perturbed and coupled channels, and waveguide crossings", Journal of Optical Society of America, vol. 34, No. 3, Mar. 1, 2017.

Bauters, et al., "Ultralow-Loss Planar Si3N4 Waveguide Polarizers," IEEE Photonics Journal, 5(1), Article S/N: 6600207 (2013).

Florjanczyk, M., et al, "Tiny spectrometer enables cost-effective space-borne sensing" SPIE Newsroom, 10.1117/2.1200912.002524, 2009.

Garanovich, I., et al., "Nonlinear directional coupler for polychromatic light", Optics Letters vol. 32, Issue 5, pp. 175-477 (2007).

Hatta, A.M., et al., "A simple integrated ratiometric wavelength monitor based on a directional coupler", Optik 125 (2014) 795-798.

Hatta, A.M., et al. "Design of the optical core of an integrated ratiometric wavelength monitor" Proceedings 14th European Conference on Integrated Optics: ECIO 08 Eindhoven: Jun. 11-13, 2008, Eindhoven University of Technology, The Netherlands, paper, ThP25.

Humaira, Z., et al: "Integrated silicon photonic TE-pass polarizer", 2016 Photonics North (PN), IEEE, May 24, 2016 (May 24, 2016).

Lallier, E., et al., "Laser Oscillation of Single-Mode Channel Waveguide in ND:MGO:LINB03", Electronic Letters, IEEE Stevenage, GB, vol. 26, No. 22, Oct. 26, 1989.

Muneeb, M., et al., "Silicon-on-insulator shortwave infrared wavelength meter with integrated photodiodes for on-chip laser monitoring", Nov. 3, 2014 | vol. 22 | No. 22 | DOI:10.1364/OE.22.027300 | Optics Express 27300.

Seyringer, D., et al., "Arrayed Waveguide Gratings", SPIE Press Book, Date Published: Jun. 3, 2016, ISBN: 981510603608, vol. SL16.

Srinivasan, S., et al., "Design of integrated hybrid silicon waveguide optical gyroscope", Optics Express 24988, vol. 22, No. 21, Oct. 20, 2014.

Tan, Y. et al., "Polarization-selective microring resonators", Optics Express, vol. 25, No. 4, Feb. 15, 2017 (Feb. 15, 2017).

Tran, M., et al., "Integrated optical driver for interferometric optical gyroscopes", Optics Express 3827,vol. 25, No. 4. Feb. 20, 2017.

Wang, P., et al., "Passive photonic integrated ratiometric wavelength monitor with resolution better than 15 pm", vol. 25, No. 3 | Feb. 6, 2017 | Optics Express 2940.

Wang, P., et al. "Wavelength Measurement Based on a Silicon-on-Insulator Directional Coupler Integrated Device", Sensors 2015, 15 21281.

(56) References Cited

OTHER PUBLICATIONS

Yu, C., et al., "Stable and Compact Optical Module for Fiber-Optic Gyroscope Application", Fiber and Integrated Optics, 33:306-314, 2014.
International Search Report and Written Opinion for PCT/US2018/021262 dated Jun. 15, 2018 entitled "Photonic Integrated Circuit for an Interference Fiber Optic Gyroscope (IFOG)".
International Search Report and Written Opinion for PCT/US2018/023472 dated Jun. 29, 2018 entitled "Integrated Optic Wavemeter and Method for Fiber Optic Gyroscopes Scale Factor Stabilization".
International Search Report and Written Opinion for PCT/US2019/055849 dated Mar. 11, 2020, titled "Photonic Integrated Circuits, Fiber Optic Gyroscopes and Methods for Making the Same".
International Search Report and Written Opinion for PCT/US2019/059195 dated Jan. 16, 2020 entitled "Method and Apparatus for Control and Suppression of Stray Light in a Photonic Integrated Circuit".
International Search Report and Written Opinion for PCT/US2020/033092 dated Sep. 4, 2020 titled "Integrated Optical Polarizer and Method of Making Same".
Lu, M.. et al., "Field Patterns of the TE Modes in Ridge-Trough Waveguide", International Journal of Infrared and Millimeter Waves, Kluwer Academic Publishers-Plenum Publishers, NE, vol. 23, No. 8, Aug. 1, 2002.
Pu, M et al., "Ultra-low-loss inverted taper coupler for silicon-on-insulator ridge waveguide", Optics Communications, Elsevier, Amsterdam, NL, vol. 283, No. 19, Oct. 1, 2010.
International Search Report and Written Opinion for PCT/US2020/045877 dated Nov. 9, 2020 titled "Integrated Optical Phase Modulator and Method of Making Same".
Park, H., et al. "Device and Integratino Technology for Silicon Photonic Transmitters", IEEE Journal of Selectred Topics in Quantum Electronics, vol. 17, No. 3, May/Jun. 2011.
International Preliminary Report on Patentability for PCT/US2019/055849 dated Apr. 8, 2021, titled " Photonic Integrated Circuits, Fiber Optic Gyroscopes And Methods For Making The Same".
International Search Report and Written Opinion for PCT/US2019/059195 dated May 14, 2021 titled "Method and Apparatus For Control and Suppression of Stray Light in a Photonic Integrated Circuit".

\* cited by examiner

METHOD AND APPARATUS FOR SELF-ALIGNMENT CONNECTION OF OPTICAL FIBER TO WAVEGUIDE OF PHOTONIC INTEGRATED CIRCUIT

RELATED APPLICATION

This application claims the benefit of U.S. Provisional Application No. 62/559,307, filed on Sep. 15, 2017. The entire teachings of the above application are incorporated herein by reference.

BACKGROUND

The following relate to evanescence wave coupling connection between optical fibers, or an optical fiber to a photonic integrated circuit (PIC) waveguide, or between PIC waveguides.

U.S. Pat. No. 4,678,267 describes coupling between narrow-and wide-channel optical waveguides is found to be very efficiently performed by coupling regions in the form of parabolas. Design equations for parabolic coupling regions are given.

U.S. Pat. No. 5,579,424 describes an arrangement for optically coupling a planar optical waveguide and an optical fiber. The arrangement comprises forming a planar optical waveguide on a surface of the substrate, forming a trench-like depression in the surface of the substrate leading from an end face of the planar waveguide to an edge of the substrate, forming a second holder part having a fiber secured between two planar surfaces lying in a common plane, and assembling the separate holder part on a pair of planar surfaces lying on each side of the depression of said substrate so that the fiber is placed in the depression with play and the fiber will be arranged with the axis of the fiber being aligned with the axis of the planar waveguide.

U.S. Pat. No. 5,600,745 describes a method of automatically coupling between a fiber and an optical waveguide. Such a scheme is achieved by the property of the different etching rates in the various wafer directions on a semiconductor material, especial silicon, and the shrinking property of the glass soot formed by a flame hydrolysis deposition technique during a high temperature consolidation process, for improved aligning accuracy. First, a waveguide buffer layer is formed on a semiconductor substrate, then a waveguide layer is formed on the semiconductor substrate and the waveguide buffer layer. A part of the waveguide is manipulated to the planar optical waveguide. Meanwhile, several windows which lead to the I/O end of the planar waveguide are formed on the other waveguide layer. The semiconductor substrate beneath the windows is etched anisotropically to form several aligning grooves. The lateral faces of these grooves and the surface of the semiconductor substrate can constitute a fixed angle.

U.S. Pat. No. 5,729,641 describes an optical device for modulating or interacting with radiation guided and propagating along an optical longitudinal axis of an optical waveguide, such as, an optical fiber, has a different directional geometry compared to conventionally comparable devices such as, for example, plasmon or planar surface modulators for optical fibers. The geometry includes a nonlinear, electro-optic medium formed between two spatially disposed electrodes. The medium/electrode sandwich is aligned along the waveguide longitudinal propagating axis and extends in a radial direction from the optical waveguide core with the inner end of the medium in spatial proximity to the waveguide core for evanescent coupling with the radiation field propagating in the waveguide. An applied electric field to the spatially disposed electrodes varies the refractive index of the electro-optic, medium from just below the effective refractive index of the waveguide to just above the effective refractive index waveguide to induce a lossy condition on the propagating radiation Modulation of the applied electric field will bring about intensity modulation of the propagating radiation.

U.S. Pat. No. 5,982,961 describes an optical coupling device, or a compound waveguide, in which optical energy is coupled to or from an optical signal propagating along a transmitting waveguide. The optical coupling device includes a thin film organic crystal waveguide positioned in optical proximity to a portion of the transmitting waveguide. The organic crystal waveguide has a first, coupling surface facing the transmitting waveguide through which the optical energy is coupled. The transmitting waveguide may be a fiber optic having at least some material removed along a side thereof to facilitate the coupling of optical energy between the fiber optic and the organic crystal waveguide. Polishing and lapping methods for producing the thin film organic crystal waveguide, with optically smooth surfaces, are also disclosed, as are organic salt implementations of the organic crystal.

U.S. Pat. No. 6,293,688 describes a tapered waveguide that couples optical waveguides of different sizes in a multi-chip optical assembly. A resonator containing a semiconductor diode amplifier is coupled to a planar waveguide structure that optically couples to an optical fiber. A single-mode semiconductor laser waveguide is flip-chip bonded to a substrate and couples to a silica waveguide structure that couples to a single-mode tantala waveguide. In a further embodiment, high-index material is provided in a gap between chips. In another embodiment, polymer material is used in the waveguide structure to modify thermal characteristics of the waveguide structure.

U.S. Pat. No. 6,360,038 describes a wavelength-selective optical device for coupling of light at predetermined wavelength from one optical fiber waveguide to another using at least two gratings and cladding-mode assisted coupling is disclosed. The transfer of light is performed using intermediate coupling to one or more cladding mode of the waveguides. In the case when the fibers have physically different claddings, an arrangement for transfer of light from one cladding to another is required. The disclosed coupler has no back-reflection, small insertion loss, and very high channel isolation. The device can be used in wavelength-division multiplexing networks.

U.S. Pat. No. 7,218,809 describes an optical mode transformer comprising a waveguide core having a high refractive index contrast between the waveguide core and the cladding, the optical mode transformer being configured such that the waveguide core has a taper wherein a thickness of the waveguide core tapers down to a critical thickness value, the critical thickness value being defined as a thickness value below which a significant portion of the energy of a light beam penetrates into the cladding layers surrounding the taper structure thereby enlarging the small mode size. This patent further describes a non-cylindrical graduated refractive index (GRID) lens structure. The grading of the refractive index is provided in a either the vertical or horizontal directions and may have either a fixed refractive index or a graded refractive index in the transverse directions. This patent further describes composite optical mode transformers that are combinations of the taper waveguide structures and the non-cylindrical graduated refractive index structures. This patent further describes the further integration of the mode transformers with V-grooves for multiple input/output fibers and alignment platform for multiple input/output photonic chips or devices.

SUMMARY

The described embodiments facilitate a self-alignment mechanism between the optical fiber and the photonic integrate waveguide and pertains to the connection of a single-mode optical fiber to a single-mode waveguide of photonic integrate circuit waveguide passively with high coupling efficiency and wide bandwidth.

The described embodiments are directed to an optical device that comprises an input fiber having a cladding and a core for providing a light input, and a target photonic integrated circuit (PIC) waveguide having a cladding and a core for receiving a light input. The cladding on one side of the input fiber is removed at the end of the fiber and a flat surface is created along a fiber core for a predetermined distance, so the flat surface is made close to the core of the fiber such that the fiber core is exposed. A flat-bottomed channel having an in-plane angle with respect to the symmetric axis of the PIC waveguide is fabricated on the top cladding layer of the PIC waveguide in the coupling area, so the upper surface of the tapered planar waveguide is therefore exposed. The flat surface of the input fiber and the top surface of the target waveguide is contacting, so the core of the input fiber being intersected with an angle with respect to the symmetric axis of the target waveguide and close together at the intersect as an interacting region to define a hybrid waveguide.

In one aspect, the invention may be an optical device compromising an input fiber configured to provide a light input. The input fiber may have a cladding and a core, with the cladding on one side of the input fiber removed at an end of the input fiber, thereby creating a flat surface along the input fiber for a predetermined distance. The flat surface may be configured to be close to the core of the fiber such that the fiber core is exposed. The optical device may further comprise a target photonic integrated circuit (PIC) waveguide configured to receive the light input. The target PIC waveguide may be planer and have a top cladding layer and a core. The optical device may further comprise a flat-bottomed channel fabricated on the top cladding layer of the target PIC waveguide in a coupling area, such that the upper surface of the target PIC waveguide is exposed. The flat surface of the input fiber may be configured to contact the top surface of the target PIC waveguide such that the core of the input fiber and the core of the target PIC waveguide are close and in parallel to each other in the coupling area to form a hybrid waveguide. The optical device may further comprise a first transition for coupling of light from the input fiber to the hybrid waveguide, and a second transition for coupling of light from the hybrid waveguide to the target PIC waveguide. The coupling area may be configured to be between the first transition and the second transition in a lengthwise direction within a plane of the waveguide.

In an embodiment, the core of the target PIC waveguide may have a higher refractive index than a refractive index of the core of the input fiber. The core of the target PIC waveguide may be silicon nitride and the cladding of the target PIC waveguide may be silicon oxide. The target PIC waveguide may be birefringent. The input fiber may be a polarization maintaining fiber. A portion of the core of the input fiber may be removed within the coupling region.

The first transition may be a start end of the target PIC waveguide, and the second transition may be a tip of the input fiber. The core of the target PIC waveguide may have a lower refractive index than a refractive index of the core of the input fiber.

In another aspect, the invention may be an optical device compromising an input fiber configured to provide a light input. The input fiber may have a cladding and a core. The cladding on one side of the input fiber may be removed at an end of the input fiber thereby creating a flat surface along the input fiber for a predetermined distance. The flat surface may be configured to be close to the core of the fiber such that the fiber core is exposed. The optical device may further comprise a target photonic integrated circuit (PIC) waveguide configured to receive the light input. The target PIC waveguide may be planer and have a top cladding layer and a core. A width of the core of the target PIC waveguide may be configured to become gradually narrow along its length, symmetrically with respect to the center axis, to define an in-plane taper. The optical device may further comprise a flat-bottomed channel fabricated on the top cladding layer of the target PIC waveguide in a coupling area, such that the upper surface of the target PIC waveguide is exposed. The flat surface of the input fiber may be configured to contact the top surface of the target waveguide, such that the core of the input fiber and the core of the target PIC waveguide are close and in parallel to each other in the coupling area to form a hybrid waveguide. The optical device may further comprise a first transition for coupling of light from the input fiber to the hybrid waveguide, and a second transition for coupling of light from the hybrid waveguide to the target PIC waveguide. The coupling area may be configured to be disposed between the first transition and the second transition in a lengthwise direction within a plane of the PIC waveguide.

In another aspect, the invention may be an optical device compromising an input fiber configured to provide a light input. The input fiber may have a cladding and a core. The cladding on one side of the input fiber may be removed at an end of the input fiber thereby creating a flat surface along the input fiber for a predetermined distance. The flat surface may be configured to be close to the core of the fiber such that the fiber core is exposed. The optical device may further comprise a target photonic integrated circuit (PIC) waveguide configured to receive the light input. The target PIC waveguide may be planer and have a top cladding layer and a core. The optical device may further comprise a flat-bottomed channel fabricated on the top cladding layer of the target PIC waveguide in a coupling area, such that the upper surface of the target PIC waveguide is exposed. The flat-bottomed channel may have an in-plane angle with respect to a symmetric axis of the PIC waveguide. The flat surface of the input fiber may be configured to contact the top surface of the target PIC waveguide, such that the core of the input fiber and the core of the target PIC waveguide are close and in parallel to each other in the coupling area to form a hybrid waveguide. The optical device may further comprise a first transition for coupling of light from the input fiber to the hybrid waveguide, and a second transition for coupling of light from the hybrid waveguide to the target PIC waveguide. The coupling area may be configured to be disposed between the first transition and the second transition in a lengthwise direction within a plane of the PIC waveguide.

In another aspect, the invention may be an optical device compromising an input fiber configured to provide a light input. The input fiber may have a cladding and a core. The cladding on one side of the input fiber may be removed at an end of input fiber, thereby creating a flat surface along the input fiber for a predetermined distance. The flat surface may be configured to be close to the core of the fiber such that the fiber core is exposed. The optical device may further comprise a target photonic integrated circuit (PIC) waveguide configured to receive the light input. The target PIC waveguide may be planer and having a top cladding layer and a core. A width of the core of the target PIC waveguide may be configured to become gradually narrow along its length, symmetrically with respect to the center axis to define an in-plane taper. The optical device may further comprise a flat-bottomed channel fabricated on the top cladding layer of the target PIC waveguide in a coupling area, such that the upper surface of the target waveguide is exposed. The flat surface of the input fiber may be configured to contact the top surface of the target waveguide such that the core of the input fiber and the core of the target waveguide are close and in parallel to each other in the coupling area to form a hybrid waveguide. The optical device may further comprise a first transition for coupling of light from the input fiber to the hybrid waveguide, and a second transition for coupling of light from the hybrid waveguide to the target PIC waveguide. The coupling area may be configured to be between the first transition and the second transition in a lengthwise direction within a plane of the PIC waveguide.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

The teachings of all patents, published applications and references cited herein are incorporated by reference in their entirety.

The described embodiments are directed to photonic integrated circuits. More particularly, described embodiments pertain to the connection of a single-mode optical fiber to a single-mode waveguide of photonic integrate circuit waveguide passively with high coupling efficiency and wide bandwidth, and to the use of such devices for optical gyroscopes and optical communications.

None of the references described in the Background Section herein enables a passively optical fiber-to-PIC waveguide connection with high coupling efficiency and wide bandwidth.

Figure 1:
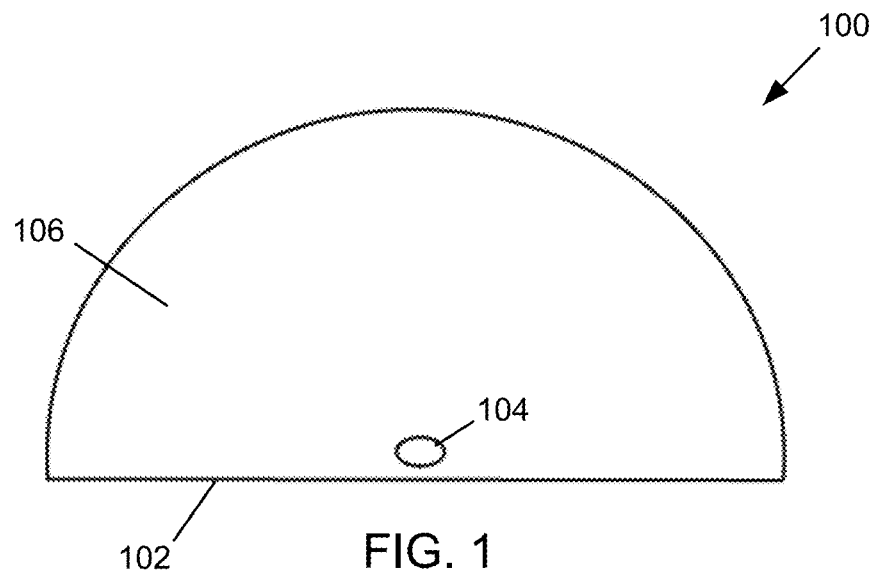
FIG. 1 shows an optical fiber with cladding removed to form a flat surface, according to an embodiment of the invention.

A self-alignment method and mechanism is disclosed that has high coupling efficiency and allows large alignment error for connection of a single-mode optical fiber to a waveguide of a photonic integrated circuit (PIC). An optical fiber 100 guiding light in single-mode spatial distribution consists of glass core 104 that has a higher refractive index than that of the surrounding glass cladding 106. The optical fiber has a predetermined dimension of the glass core, and the difference of the refractive index between the glass core 104 and cladding 106 such that the waveguide supports only the fundamental mode. At the end of the fiber 100, the glass cladding on one side of the optical fiber is removed and a flat surface 102 is created along a fiber core 104 for a predetermined distance, as shown in FIG. 1. The flat surface 102 is made close to the core 104 of the fiber 100 such that the fiber core 104 is exposed. This means that the evanescent optical wave of the guided light is extended beyond the flat surface 102 of the cladding material, and the percentage of the light power that is distributed beyond the flat surface 102 is dependent on the refractive index of the material that replacing the original cladding glass.

Figure 2:
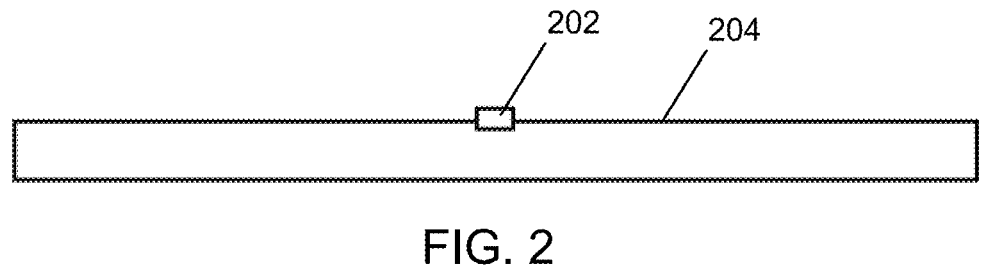
FIG. 2 shows a PIC waveguide with cladding removed from atop the waveguide core, according to an embodiment of the invention.

A single-mode optical waveguide of a PIC consists of a waveguide core that is buried into cladding material. The core has a higher refractive index than that of the cladding material. The PIC waveguide is configured to have a predetermined dimension of the core, and the difference of the refractive index between the core and cladding, such that the waveguide supports only the fundamental mode. In a section of the PIC where the light is launched, a predetermined area of cladding material atop the waveguide core 202 is removed to allow the electromagnetic wave of the guided light to extend into the material replaced by the cladding, as shown in FIG. 2. This means that the evanescent optical wave of the guided light is extended beyond the top surface 204, and the percentage of the light power that is distributed beyond the top surface 204 is dependent on the refractive index of the material that replacing the original cladding material. In an embodiment, the waveguide core is silicon nitride, and the cladding material is silicon oxide. In another embodiment, the waveguide core is a thin silicon nitride strip, the thickness of which is less than 100 micrometers.

Figure 3:
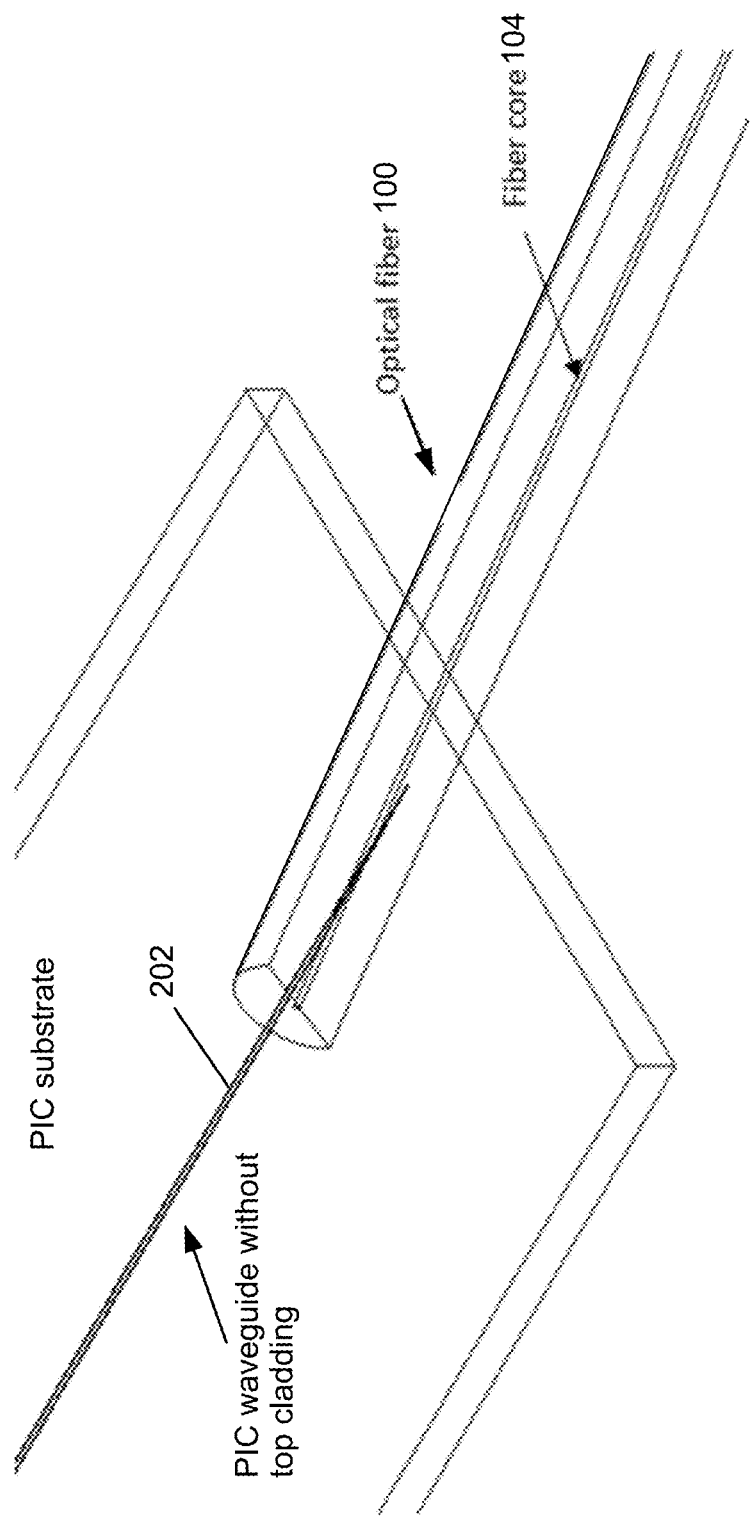
FIG. 3 shows a plan view of a flat-surfaced optical fiber disposed on a PIC waveguide, according to an embodiment of the invention.

To make the guided light transfer between fiber and PIC waveguide with low coupling loss, the fiber section at the tip where the cladding material is removed is laid down in such a way that the flat surface is facing downwards and the core is aligned along the PIC waveguide in the area where the cladding of the planar waveguide is also removed, as shown in FIG. 3. The two cores of the waveguides are arranged close to each other such that there is large overlap of the two evanescent fields, so as to form a hybrid waveguide in the overlapping region.

Figure 4:
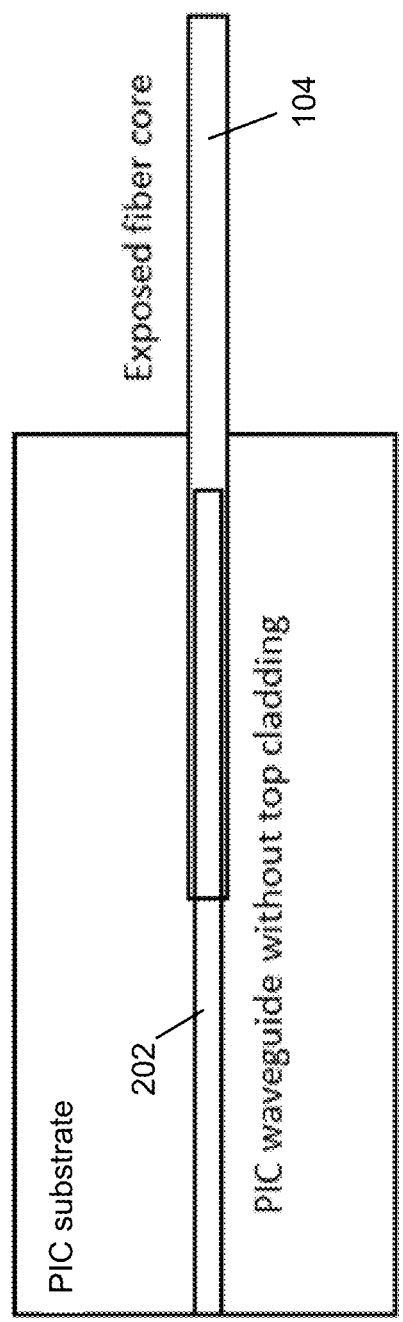
FIG. 4 shows a top view of the optical fiber and PIC waveguide shown in FIG. 3, according to an embodiment of the invention.

The fiber core can be placed directly on the top of the PIC core, as shown in FIG. 4 (viewed as a top view, looking down at the top surface of the PIC). The hybrid waveguide supports only a single mode. In an embodiment, the cores of the two waveguides are arranged attached to each other for a distance and the refractive index of the PIC waveguide core is substantially higher than that of the fiber waveguide, so that the fiber core serves as a cladding to the PIC waveguide. In this way, the hybrid waveguide supports a single mode light propagation, but with a different propagation constant from both the PIC waveguide and fiber waveguide. Furthermore, the cross-section of the guided light beam changes abruptly when the beam transfers from the fiber to the hybrid waveguide and when from the hybrid to the PIC waveguide. The abrupt changes facilitate coupling of the lowest-order mode into a radiation mode, and may increase the transition loss. Fabricating the PIC waveguide in an optimized shape as described herein, on the other hand, may greatly reduce the transition loss.

Figure 5:
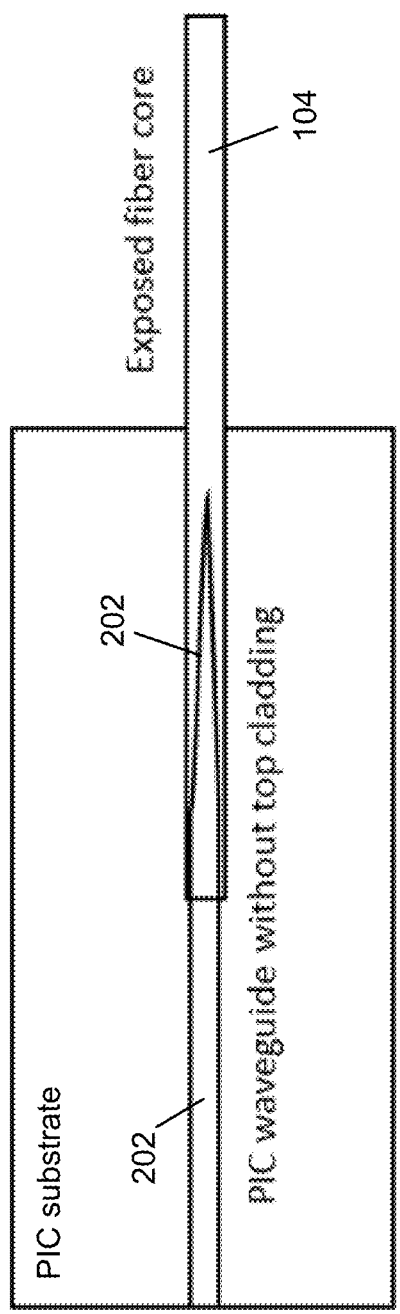
FIG. 5 shows a hybrid waveguide formed according to an embodiment of the invention.

In the described embodiments, the PIC waveguide width may be gradually tapered to a smaller width at the end. As shown in FIG. 5, a hybrid waveguide may be constructed by placing the cladding-removed fiber 104, with the flat surface facing downwards (i.e. toward the PIC substrate), close to and aligned along the tapered section 502 of the PIC waveguide 202 where the cladding of the PIC waveguide is also removed, facilitating a large overlap of the two evanescent fields. The fiber core 104 can be placed right on the top of the tapered section 502 of the PIC core, and it can also be shifted sideways.

The hybrid waveguide changes the cross-section of a guided beam. The guided light in the fiber waveguide is coupled into the hybrid waveguide though a transition of a gradual expansion of the effective guide cross-section. If this expansion is gradual enough (as set forth in more detail below), the fiber mode will progressively evolve into the lowest-order mode without mode conversion. U.S. Pat. No. 4,678,267 discloses a simple design rule that ensures an adiabatic operation in a symmetric taper. The lowest-order optical mode is well confined by a waveguide, so the lowest-order mode is well confined in the taper without mode conversion to higher-order modes or radiation modes, if the taper is designed to satisfy a condition defined by:

$$\theta = \frac{\alpha \lambda}{2n_{eff} W}, \quad (1)$$

where α is a constant, less than or equal to unity, related to the rate of taper of the PIC waveguide core (discussed in more detail herein). The parameter θ is the local half angle of the taper, λ is the wavelength in vacuum, $n_{eff}$ is the mode effective index of the mode confined in the hybrid waveguide, and W is the local full width of the taper. The adiabatic propagation condition of Eq. (1) is obtained using a design criterion of a slower expansion of the waveguide width than the diffraction divergence of the lowest order mode. If θ is larger than the divergence angle of the lowest mode in the ray model, the ray would not "see" the waveguide sidewalls, and the phase front of the wave would become distorted and would result in mode conversion from the lowest-order mode.

Eq. (1) suggests that the local waveguide width expansion slope along the propagation direction, z, satisfies:

$$\theta = \frac{dW}{dz} = \frac{\alpha \lambda}{n_{eff} W}. \quad (2)$$

Assuming $n_{eff}$ is independent of W, and $W=W_0$ at z=0 is input waveguide width, integration of Eq. (2) yields:

$$\frac{W^2 - W_0^2}{2l} = z, \quad (3)$$

where $$l = \alpha \lambda / n_{eff} \quad (4)$$

is a parameter that is less than or equal to the wavelength of the lowest-mode of the propagating light. Therefore, taper shape should be parabolic under the assumption that $n_{eff}$ is a constant. Considering the $n_{eff}$ is a function of W, the optimized taper shape is divergent from the parabolic shape.

All the above-described coupling schemes necessitate the core-exposed fiber being placed in parallel to and close enough to the PIC waveguide core that the interaction between the two waveguides is maintained. This means that the coupling efficiency is strongly dependent on the alignment accuracy, which is usually limited to sub-micrometer by typical PIC fabrication techniques. Therefore, a live alignment is regularly practiced.

Figure 6:
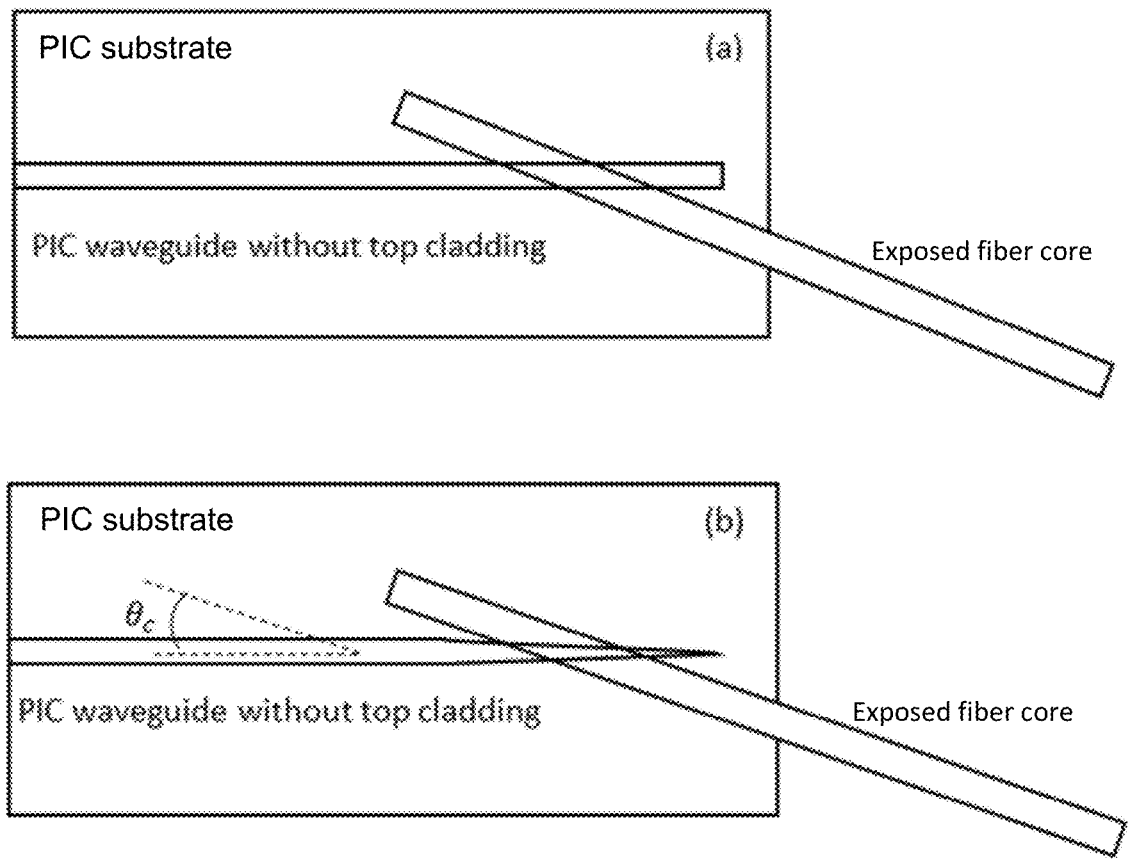
FIG. 6 shows an optical fiber disposed on a PIC at an angle $\theta_c$, according to an embodiment of the invention.

The example embodiments described herein present a procedure that enables the connection of an optical fiber to a PIC waveguide requiring a very low alignment accuracy, but resulting in a high coupling efficiency. The procedure facilitates a passive and low-loss fiber to PIC waveguide connection. The key arrangement is to place a core-exposed fiber on top of the taper area of the PIC waveguide with a predetermined crossing angle, $\theta_c$, as shown in FIG. 6. The angle guarantees the optical interaction between the fiber and the PIC waveguide. Under the design rule explained by U.S. Pat. No. 4,678,267, the lowest-order optical mode is well confined by a waveguide if the taper is designed to satisfy a condition defined by $$\theta + \theta_c = \frac{\alpha \lambda}{2n_{eff} W} \quad (5)$$

Therefore, the projection of the ray angle of the lowest-order mode in the plane of the waveguide would not exceed the local angle of the wall of the waveguide. The ray would be confined by the waveguide wall and the phase front of the wave would not become distorted.

Representing the angle θ by the local wall slope in the z-direction, we have a differential equation for the waveguide width, $$\frac{dW}{dz} + 2\theta_c = \frac{\alpha \lambda}{n_{eff} W} \quad (6)$$

Again, if assuming $n_{eff}$ is independent of W, and $W=W_0$ at $z=0$ and $\theta_c \neq 0$, integration of Eq.(6) yields $$\frac{l}{4\theta_c^2} \ln \left| \frac{2\theta_c W - l}{2\theta_c W_0 - l} \right| + \frac{1}{2\theta_c}(W - W_0) = -z \quad (7)$$

where parameter l is as defined previously. The $W_0$ value is the input waveguide width.

Figure 7:
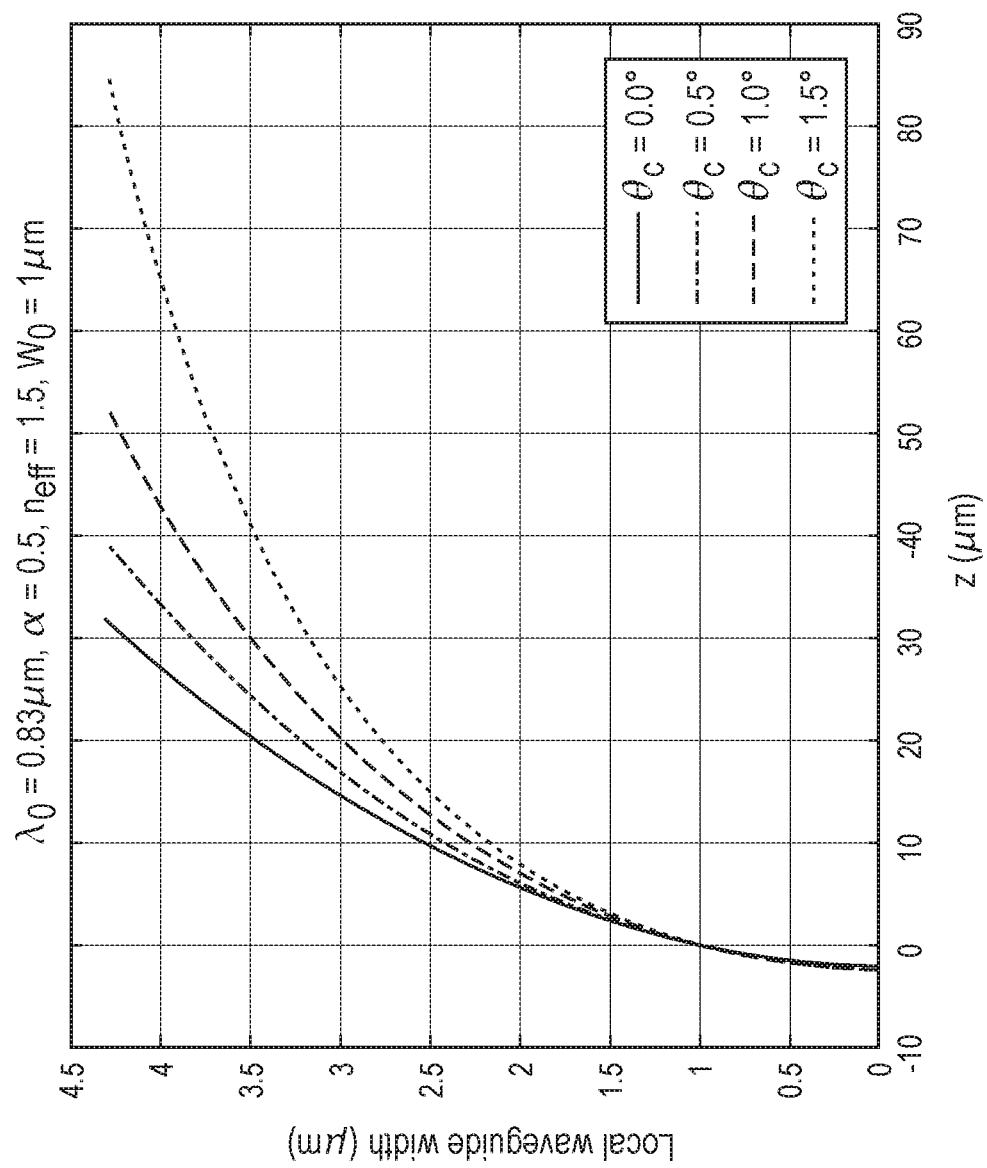
FIG. 7 shows a plot of the waveguide width as a function of z at different crossing angles $\theta_c$, according to an embodiment of the invention.

FIG. 7 is a plot of the W as a function of z at different crossing angles $\theta_c$, where $\lambda=0.83$ μm, $\alpha=0.5$, $n_{eff}=1.5$, and $W_0=1$ μm. The $\theta_c=0°$ curve is parabolic plotted per Eq. (3), while the curves for $\theta_c=0.5°$, $1.0°$ and $1.5°$ are plotted based on Eq. (7). FIG. 7 indicates that a taper with slower width slope (i.e., more gradual width change) is required when the light is launched with an angle (i.e., $\theta_c \neq 0$), than that when the axes of the two cores are aligned in parallel. In other words, the larger the input angle $\theta_c$ is, the slower the taper is required.

Figure 8:
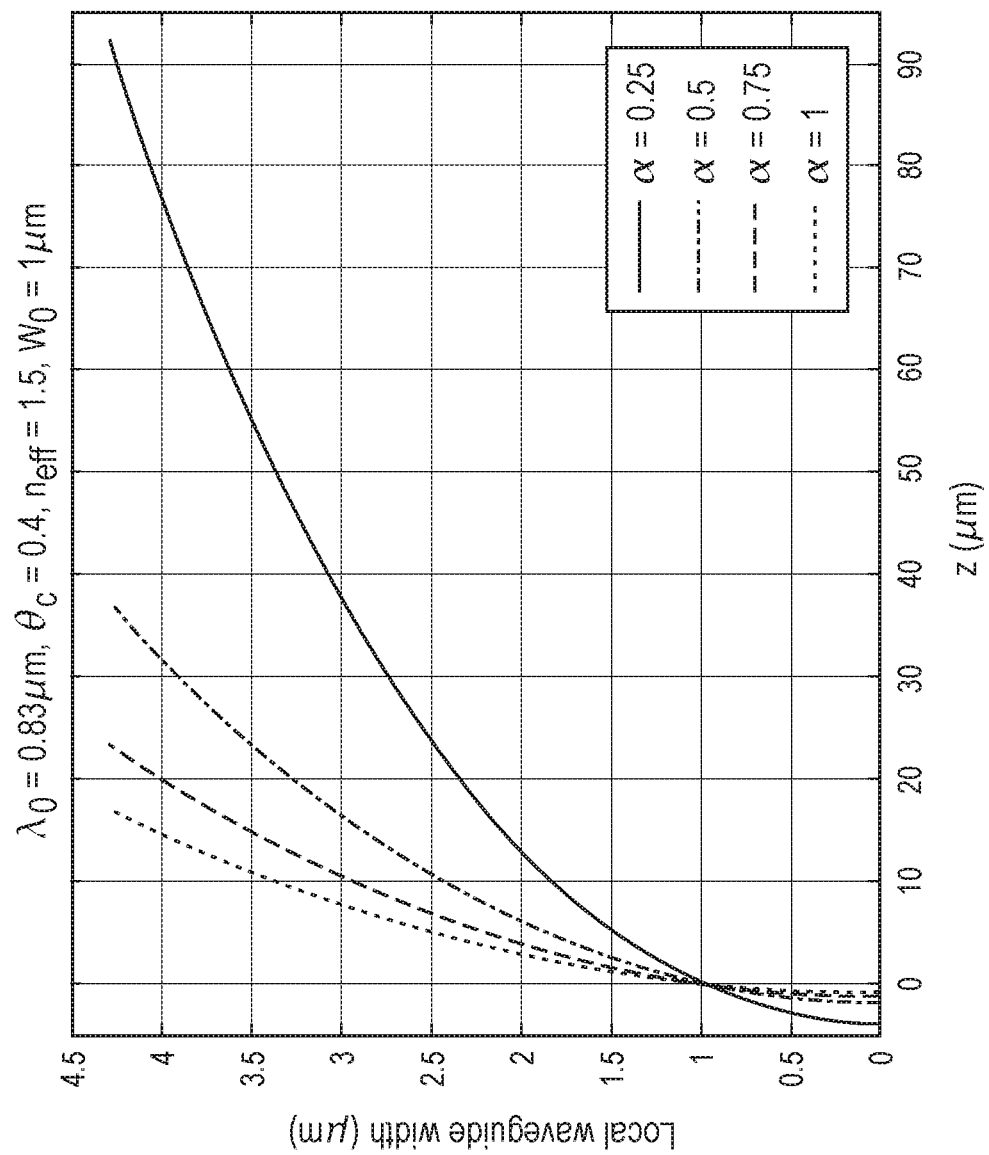
FIG. 8 shows a plot of the waveguide width as a function of z at different values of the constant α, according to an embodiment of the invention.

FIG. 8 is a plot of the W as a function of z at different values of α, where $\lambda=0.83$ μm, $\theta_c=0.5$, $n_{eff}=1.5$, and $W_0=1$ μm. A small α value means shorter effective wavelength per Eq. (4) being diffracted. Since a shorter wavelength has a larger ray angle of the lowest-order mode, a more gradual taper will be needed for an adiabatic propagation through the coupling area.

Figure 9:
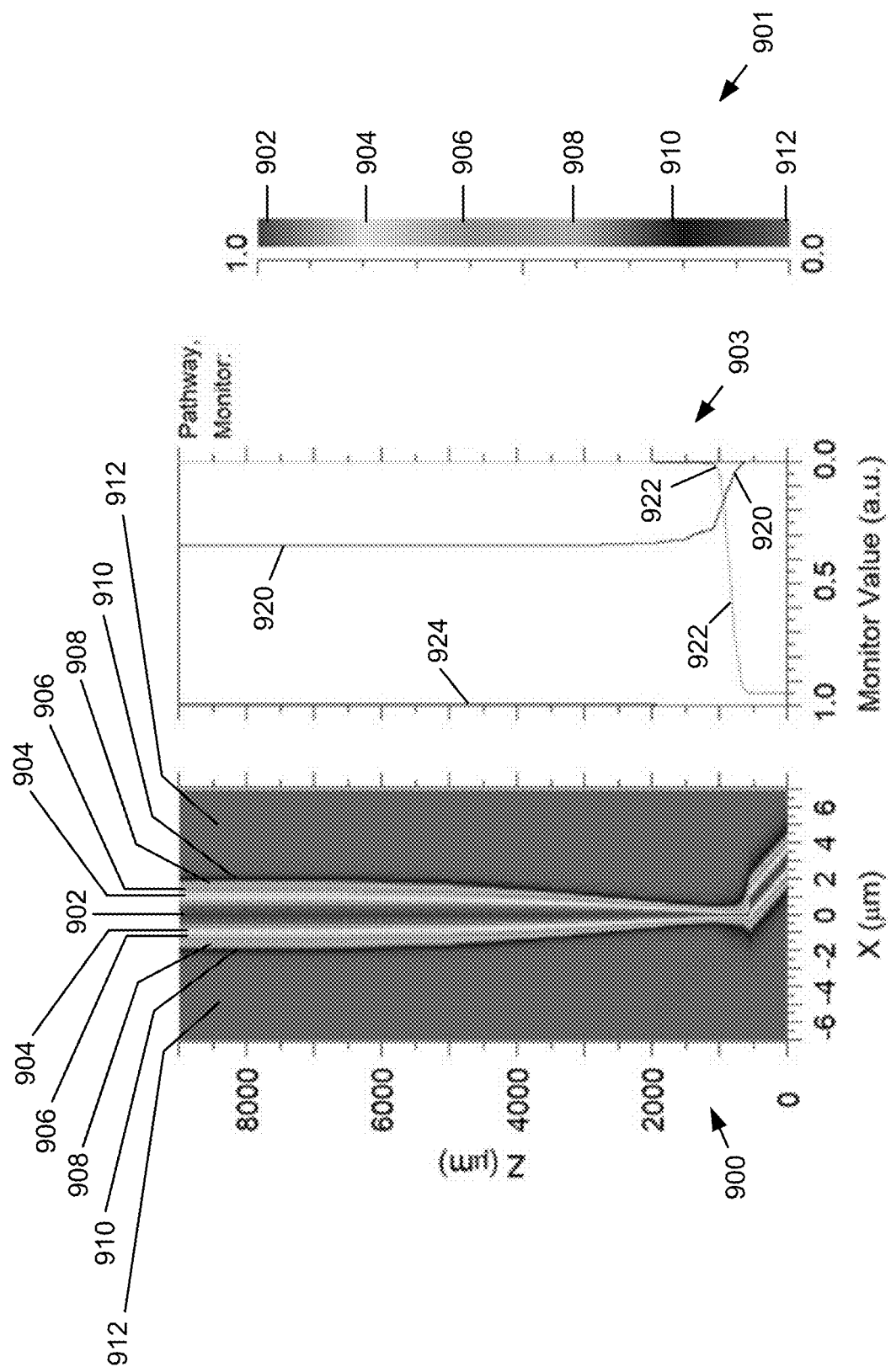
FIG. 9 illustrates the simulated optical powers guided by the fiber, the PIC waveguide and the total optical fiber for an example embodiment of the invention.

FIG. 9 illustrates the simulated optical powers guided by the fiber, the PIC waveguide and the total optical fiber on one embodiment of the device. The optical fiber has 4.3 um×4.3 um mode field to the 1/e^2 of the power, and the mode field for the output PIC waveguide has a mode field of 1.0 um×4.3 um. The core-exposed fiber is overlaid on the top of PIC waveguide taper with a shape described by Eq. (7). To guarantee a high efficient coupling between the fiber and the PIC waveguide, the fiber axis is laid across the taper section with a 0.25° angle to the symmetric axis of the PIC waveguide. The graphical display 900 shows a contour plot of the optical field at x-z view. Legend 901 defines the shading shown in graphical display 900, with reference numbers 902, 904, 906, 908, 910 and 912 identifying reference points of the shading.

Figure 10:
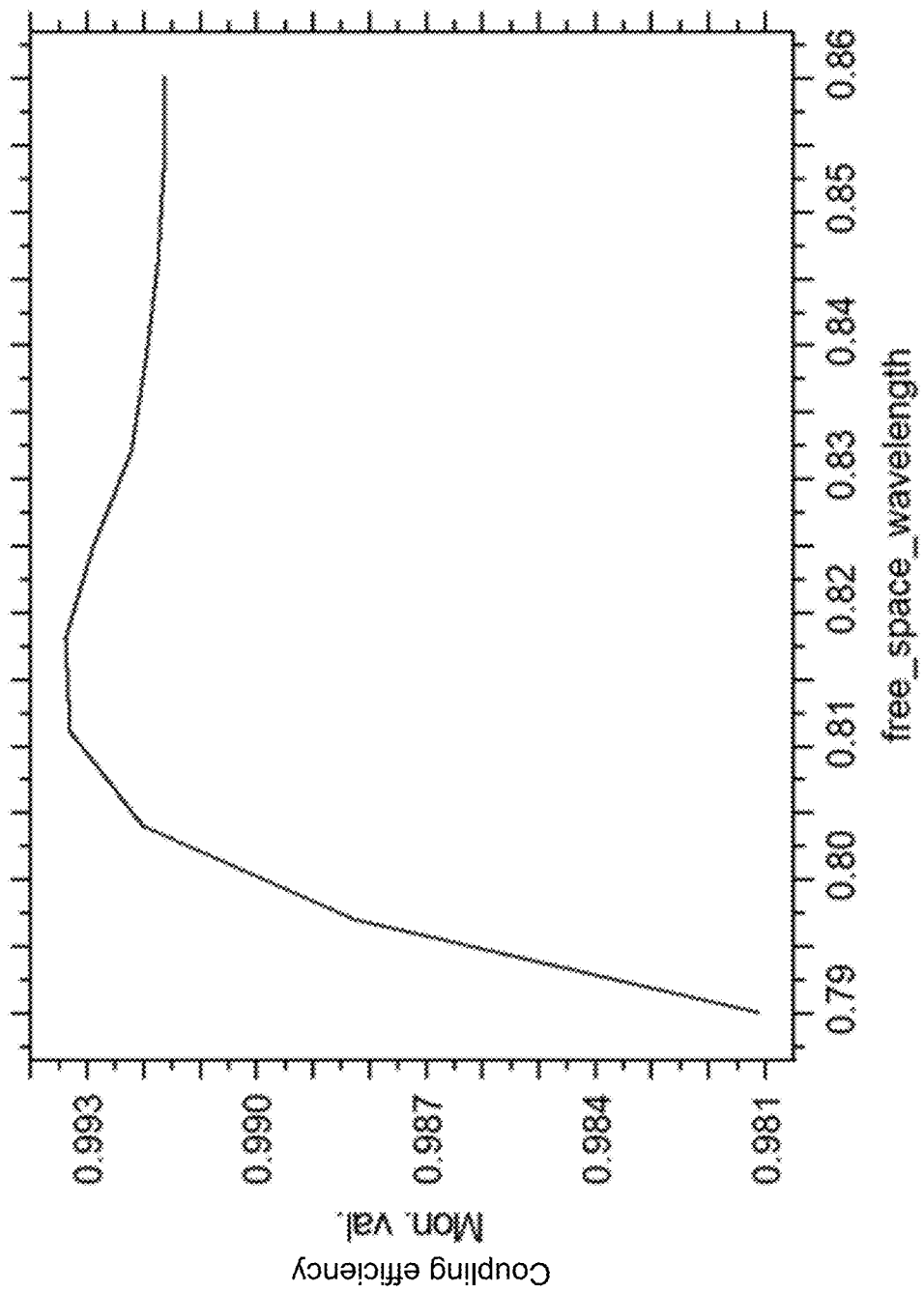
FIG. 10 illustrates the dependency of coupling efficiency on wavelength, according to an example embodiment of the invention.
Figure 11:
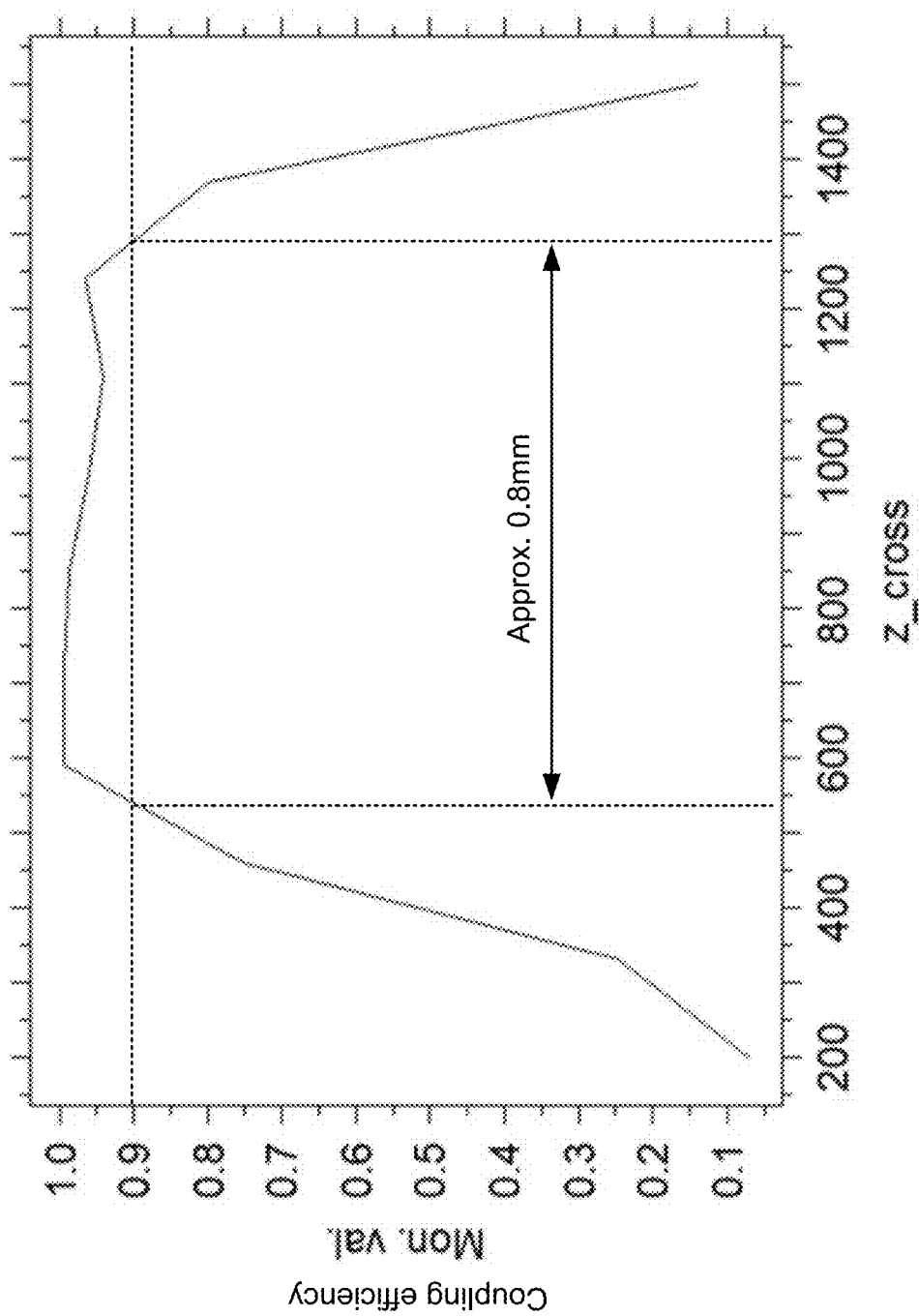
FIG. 11 shows alignment tolerance for positioning the fiber onto the waveguide taper, according to an example embodiment of the invention.

Plot 903 shows the results of percentage of light, normalized to the input power. Line 920 is partial power propagating in the fiber core, line 922 indicates the partial power guided in the PIC waveguide core, and line 924 indicates the total power. The coupling efficiency is 98% from the fiber waveguide to the PIC waveguide in this embodiment. The coupling efficiency is weakly dependent on the operation free space wavelength, as indicated in FIG. 10. The operation wavelength in FIG. 10 ranges between 790~850 nm. In this wavelength bandwidth, the coupling efficiency, or the normalized guide optical power, is higher than 0.98. FIG. 11 shows that alignment tolerance for positioning the fiber onto the taper is approximately 0.8 mm to keep the coupling efficiency higher than 90%. This position accuracy is well achievable with a standard microfabrication technology.

Figure 12:
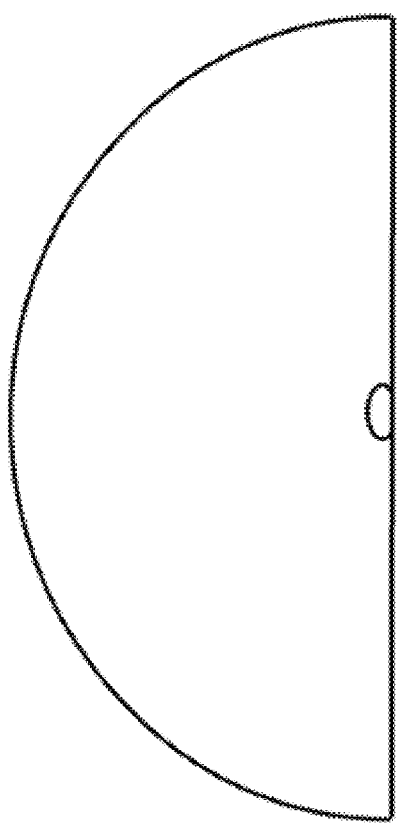
FIG. 12 shows a flat-surfaced optical fiber with a portion of its core also removed, according to an embodiment of the invention.
Figure 13:
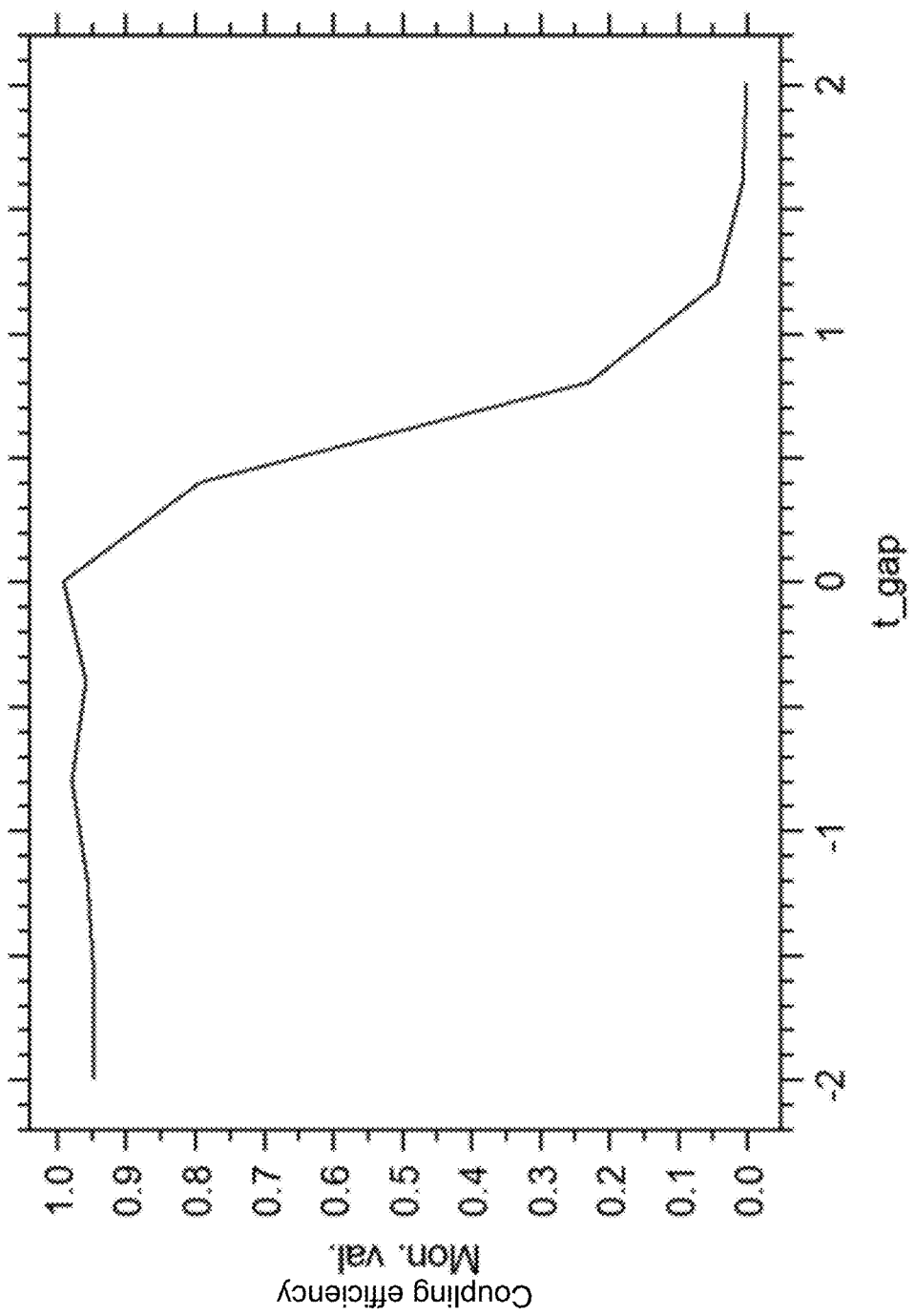
FIG. 13 shows coupling efficiency of an optical fiber as illustrated in FIG. 12.

Another important requirement to maintain a low coupling loss is that the fiber flat surface needs to be overlaid onto the top surface of the PIC waveguide very closely. The gap required to achieve a better than 90% coupling efficiency in this embodiment is less than 0.2 μm, which is difficult to realize due to various reasons, e.g., the possibility that the flat is unevenly micro-machined, or not applying enough pressing force to the fiber to overcome the counter-force from the surface tension of the bonding adhesive. In an embodiment, the cladding material of the mating fiber may be over-removed, such that a portion of the fiber core is also removed, as indicated in FIG. 12. Using this type of over-etched fiber as an overlay on the in-plan tapered waveguide, the coupling efficiency is still larger than 90% if there is a 2.2 micron gap between the fiber flat and the PIC waveguide, as shown in FIG. 13.

There are different techniques to expose an optical fiber core. One technique is side-polished fibers made by embedding fibers in silicon V grooves and by polishing them mechanically. [see, e.g., Shiao-Min Tseng and Chin-Lin Chen, "Side-polished fibers," Appl. Opt. 31, 3438-3447 (1992); R. A. Bergh et al, "Single Mode Fiber Optic Components" in Fiber-Optic Rotation Sensors and Related Technologies, Springer-Verlag Berlin Heidelberg. New York 1980, eds. S Ezekiel and H. J. Arditty. pp. 136-143]. The technique was widely used to manipulate the guided light in the fiber to make optical sensor prototypes.

Another technique is to draw a D-shape fiber. The process started with a preform made in the D-shape [see, e.g., T. D. Monte, L. Wang and R. Dyott "Elliptical Core and D-shape Fibers" in Specialty Optical Fibers Handbook, Amsterdam Boston Heidelberg London, eds. A. Mendez and T. F. Morse, pp. 513-554]. After finishing the standard fabrication of the preform, the circular preform is grinded to remove the silicon oxide on one side of the preform and the cross-section profile of the preform is in D-shape. The flat surface of the grounded preform is kept at enough of a distance from the waveguiding core such that no additional optical attenuation will be generated by the surface. The D-shaped fiber preform is then drawn down size to single mode fiber. To access the evanescent wave of the guided light, a section of the D-shaped fiber must be further exposed. The process for the fine removal of the cladding is usually carried out actively, such that the light is launched from one end of the fiber and the output power is monitored on the other end. The degree of the cladding removal is in-situ monitored by the output power measurement.

There are different technologies for cladding removal such as mechanical polishing, excimer laser ablation, and ultrafast laser micro drilling. In an embodiment, the D-shaped fiber is chemically etched to a desired core exposure by chemicals such as glass etching creams, hydro fluoride acid and buffered hydro fluoride. Fiber optical polarizers, two-by-two fused fiber couplers, and phase modulators have been demonstrated on these types of fiber [Liming Wang and Thomas D. Monte, "Phase modulation of an electro-optic polymer cladded polarization-maintaining optic fiber", Optics Letters, 33, pp. 1078-1080 (2008)].

Figure 14:
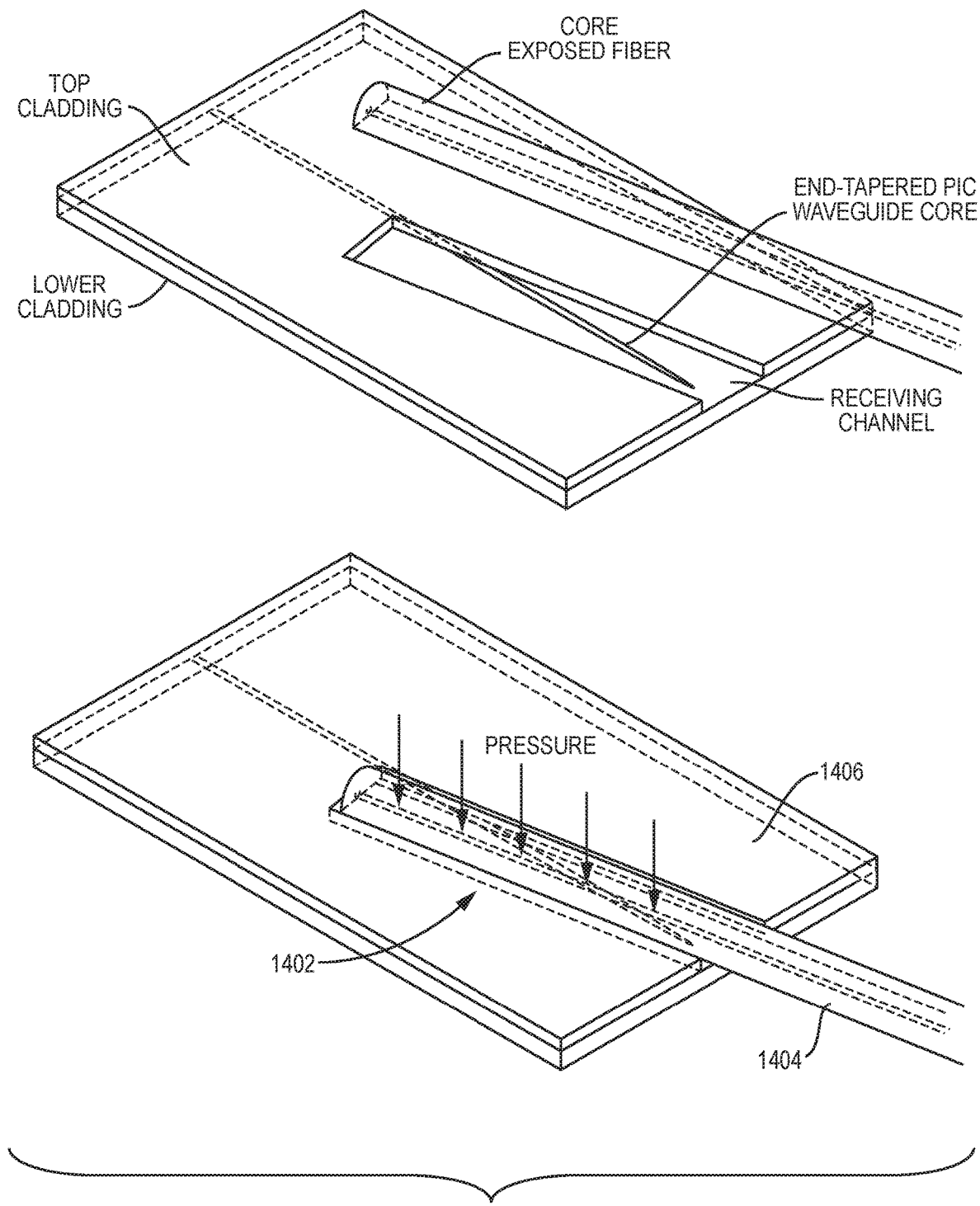
FIG. 14 illustrates an optical fiber being coupled to a PIC waveguide according to an embodiment of the invention.

In an example embodiment, the details of the coupling area are shown in FIG. 14, which depicts the coupling area 1402 where the D-shaped fiber 1404 is still separated from and above the PIC surface 1406. A flat-bottomed channel may be fabricated on the top cladding layer of the PIC waveguide, the upper surface of the tapered core at the end of the planar waveguide is therefore exposed. The channel may be made with width that allows the fiber to be tightly set into the channel, with the flat surface of the D-fiber in close contact with the top surface of the PIC waveguide. An optically clear adhesive with a predetermined refractive index may be applied between the two surfaces, which keeps the fiber in place and supplies smooth refractive index transition between the two waveguides. Since the channel can be fabricated along with the waveguide fabrication process, the PIC in-plane position (x and z-position) accuracy of core-exposed fiber is limited by the accuracy of microfabrication. As previously explained, in an embodiment the channel may be set to a predetermined angle in the PIC plane with respect to the symmetric axis of the PIC waveguide. This ensures an intersection of the fiber waveguide with the PIC waveguide and drastically loosens the tolerance of the fiber in-plane position error. Since the fiber flat surface is in contact with the bottom surface of the channel, the out-of-plane position (y-position) of the fiber is also well defined. The accuracy of the y-position is determined by the precision of both the depth of the channel and flat-to-core distance of the D fiber. A uniform pressure is preferably applied onto the round side of the D-fiber, as indicated in portion (b) of FIG. 14, to guarantee a tight contact between the two surfaces. The pressure can be supplied by the bonding force between the PIC top surface and lower surface of a plate on top of round side of the fiber (not shown in the diagram).

In some of applications, such as a fiber optic gyroscope, a linear polarized light is required to be maintained in the optical system. In an embodiment, the direction of the operation polarization is in the PIC plane. Since the polarization direction can be well maintained in both PIC and fiber waveguide by the respective birefringent waveguide designs, the polarization alignment accuracy in the coupling area is mainly dependent on the accuracy of the flat surface alignment of the D-fiber with the polarization axis of a polarization maintaining fiber. The removal of the side cladding of the fiber can be carried out in pre-calibrated and controlled conditions to achieve an accurate flat surface alignment with respect to the fiber axis, by using a suitable method such as preform grounding followed by wet-etching of a D-shaped fiber, or laser ablation, or laser micro-drilling, or mechanical polishing of a PM fiber, among others.

The described procedure and apparatus facilitate a self-alignment between the optical fiber and the photonic integrated waveguide in all the six degrees of freedom; two-dimension (2D) in-plane position and the 2D tilt angle of the fiber are defined by the micro-fabricated channel, while the one-dimensional (1D) out-of-plane position and 1D polarization angle of the fiber are determined by the fiber flatness accuracy. Furthermore, the tapered PIC waveguide end and in-plane angled channel make the above-mentioned first five dimensions very insensitive to errors due to translation and angular misalignment. All these advantages facilitate a passive alignment. The assembling process can be automated with a high throughput.

In prior art implementations, to connect a fiber to an optical planar waveguide with a high coupling efficiency, end-fire coupling methods have proved to be the most efficient technique. The crucial condition for a high efficient coupling is to match the mode fields of the two waveguides. This is regularly achieved either by fabricating a mode spot converter at the end of the PIC waveguide, or by manipulating the profile of output light from the fiber. This can be done by micro-fabricating a lensed fiber tip, or by adding an external focus lens. Although the efficiency can be improved, dramatically in some cases, the coupling efficiency is very sensitive to the alignment error. The position accuracy is regularly in order of sub-micrometer, which, to achieve, requires a meticulous active alignment. If no mode-spot converter or lens is utilized, the coupling efficiency is often sizably lower. For instance, if the same fiber and waveguide structures in FIG. 9 are connected using end-fire coupling, and without a convertor or a focus lens, the maximum coupling efficiency is typically only about 39%.

While example embodiments have been particularly shown and described, it will be understood by those skilled in the art that various changes in form and details may be made therein without departing from the scope of the embodiments encompassed by the appended claims.

What is claimed is:

1. An optical device comprising:
an input fiber configured to provide a light input, the input fiber having a cladding and a core, the cladding on one side of the input fiber being removed at an end of the input fiber thereby creating a flat surface along the input fiber for a predetermined distance, the flat surface configured to be parallel with a central axis of the core and to be adjacent a tangent to an outer surface of the core, such that a resultant mode-field guided by the fiber is exposed;
a target photonic integrated circuit (PIC) waveguide configured to receive the light input, the target PIC waveguide being planer, having a top cladding layer and a core having a gradual taper from a base width to an end width at the first end, the end width being smaller than the base width;
a flat-bottomed channel fabricated on the top cladding layer of the target PIC waveguide in a coupling area, such that the upper surface of the target PIC waveguide is exposed, a longitudinal center axis of the flat-bottomed channel configured to form a non-zero angle $\theta_C$ at a crossing location on a longitudinal center axis of the waveguide;
the flat surface of the input fiber configured to contact the top surface of the target PIC waveguide such that the core of the input fiber and the core of the target PIC waveguide are close and in parallel to each other in the coupling area to form a hybrid waveguide;
a first transition for coupling of light from the input fiber to the hybrid waveguide; and
a second transition for coupling of light from the hybrid waveguide to the target PIC waveguide;
the coupling area configured to be between the first transition and the second transition in a lengthwise direction within a plane of the PIC waveguide.

2. The device of claim 1, wherein the core of the target PIC waveguide has a higher refractive index than a refractive index of the core of the input fiber.

3. The device of claim 1, wherein the core of the target PIC waveguide is silicon nitride and the cladding of the target PIC waveguide is silicon oxide.

4. The device of claim 1, wherein the target PIC waveguide is birefringent.

5. The device of claim 1, wherein the input fiber is a polarization maintaining fiber.

6. The device of claim 1, wherein a portion of the core of the input fiber is removed within the coupling region.

7. The device of claim 1, wherein the first transition is a start end of the target PIC waveguide and the second transition is a tip of the input fiber.

8. The device of claim 1, wherein the core of the target PIC waveguide has a lower refractive index than a refractive index of the core of the input fiber.

9. An optical device comprising:
an input fiber configured to provide a light input, the input fiber having a cladding and a core, the cladding on one side of the input fiber being removed at an end of the input fiber thereby creating a flat surface along the input fiber for a predetermined distance, the flat surface configured to be parallel with a central axis of the core and to be adjacent a tangent to an outer surface of the core, such that a resultant mode-field guided by the fiber is exposed;

a target photonic integrated circuit (PIC) waveguide configured to receive the light input, the target PIC waveguide being planer and having a top cladding layer and a core, a width of the core of the target PIC waveguide configured to become gradually narrow along its length, symmetrically with respect to the center axis to define an in-plane parabolic taper;

a flat-bottomed channel fabricated on the top cladding layer of the target PIC waveguide in a coupling area, such that the upper surface of the target PIC waveguide is exposed, a longitudinal center axis of the flat-bottomed channel configured to form a non-zero angle $\theta_C$ at a crossing location on a longitudinal center axis of the waveguide;

the flat surface of the input fiber configured to contact the top surface of the target waveguide such that the core of the input fiber and the core of the target PIC waveguide (i) intersect at the in-plane angle with respect to the center axis of the target PIC waveguide, and (ii) are close to each other in the coupling area to form a hybrid waveguide;

a first transition for coupling of light from the input fiber to the hybrid waveguide; and a second transition for coupling of light from the hybrid waveguide to the target PIC waveguide;

the coupling area configured to be between the first transition and the second transition in a lengthwise direction within a plane of the PIC waveguide.

10. The device of claim 9, wherein the core of the target PIC waveguide has a higher refractive index than a refractive index of the core of the input fiber.

11. The device of claim 9, wherein the core of the target PIC waveguide is silicon nitride and the cladding of the target PIC waveguide is silicon oxide.

12. The device of claim 9, wherein the target PIC waveguide is birefringent.

13. The device of claim 9, wherein the input fiber is a polarization maintaining fiber.

14. The device of claim 9, wherein a portion of the core of the input fiber is removed in the coupling region.

15. The device of claim 9, wherein the first transition is a start end of the taper of the target PIC waveguide and the second transition is a tip of the input fiber.

16. The device of claim 9, wherein the core of the target PIC waveguide has a lower refractive index than a refractive index of the core of the input fiber.

17. An optical device comprising:

an input fiber configured to provide a light input, the input fiber having a cladding and a core, the cladding on one side of the input fiber being removed at an end of the input fiber thereby creating a flat surface along the input fiber for a predetermined distance, the flat surface configured to be close to the core of the fiber such that the fiber core is exposed;

a target photonic integrated circuit (PIC) waveguide configured to receive the light input, the target PIC waveguide being planer and having a top cladding layer and a core, a width of the core of the target PIC waveguide configured to become gradually narrow along its length, symmetrically with respect to the center axis to define an in-plane parabolic taper;

a flat-bottomed channel fabricated on the top cladding layer of the target PIC waveguide in a coupling area, such that the upper surface of the target PIC waveguide is exposed, the flat-bottomed channel oriented at a non-zero in-plane angle with respect to the center axis of the target PIC waveguide;

the flat surface of the input fiber configured to contact the top surface of the target waveguide such that the core of the input fiber and the core of the target PIC waveguide (i) intersect at the in-plane angle with respect to the center axis of the target PIC waveguide, and (ii) are close to each other in the coupling area to form a hybrid waveguide;

a first transition for coupling of light from the input fiber to the hybrid waveguide; and a second transition for coupling of light from the hybrid waveguide to the target PIC waveguide;

the coupling area configured to be between the first transition and the second transition in a lengthwise direction within a plane of the PIC waveguide.

18. The device of claim 17, wherein the core of the target waveguide has a higher refractive index than a refractive index of the core of the input fiber.

19. The device of claim 17, wherein the core of the target PIC waveguide is silicon nitride and the cladding of the target PIC waveguide is silicon oxide.

20. The device of claim 17, wherein the target PIC waveguide is birefringent.

21. The device of claim 17, wherein the input fiber is a polarization maintaining fiber.

22. The device of claim 17, wherein a portion of the core of the input fiber is removed in the coupling region.

23. The device of claim 17, wherein the first transition is a start end of the taper of the target PIC waveguide and the second transition is a tip of the input fiber.

24. The device of claim 17, wherein the core of the target PIC waveguide has a lower refractive index than a refractive index of the core of the input fiber.

* * * * *